Oct. 28, 1930.                E. E. McGREW                 1,780,088
AUTOMOBILE AWNING AND SHADE
Filed Aug. 12, 1927
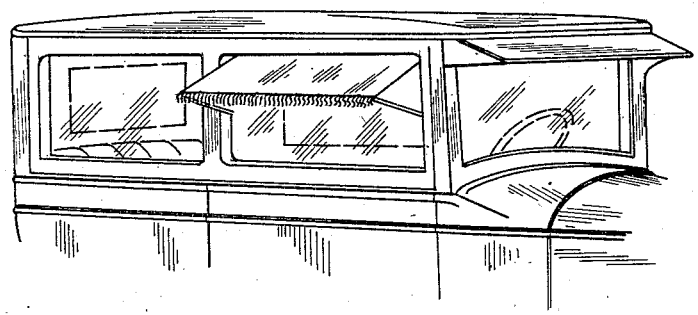
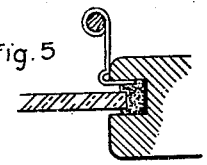
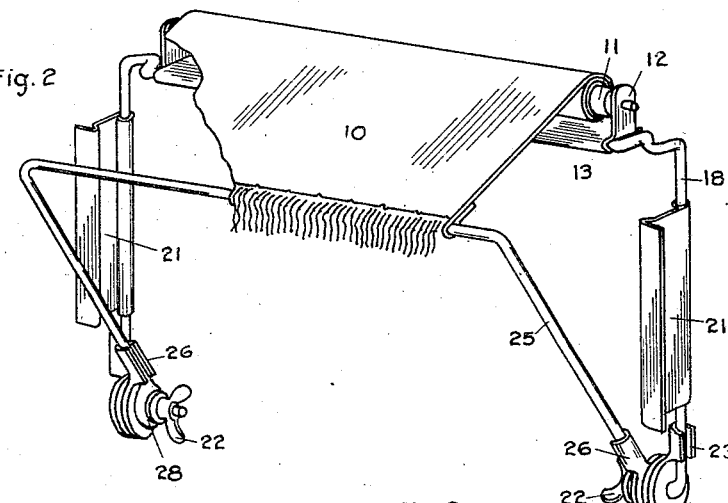
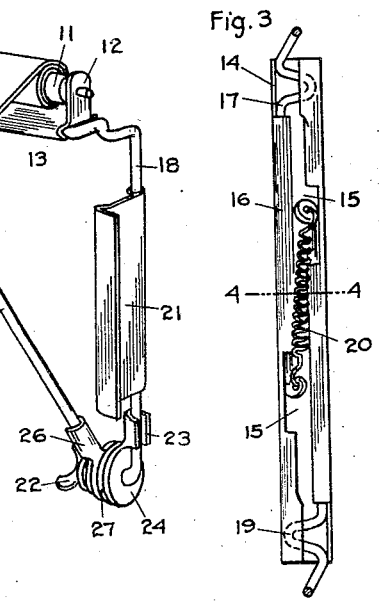
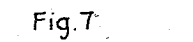
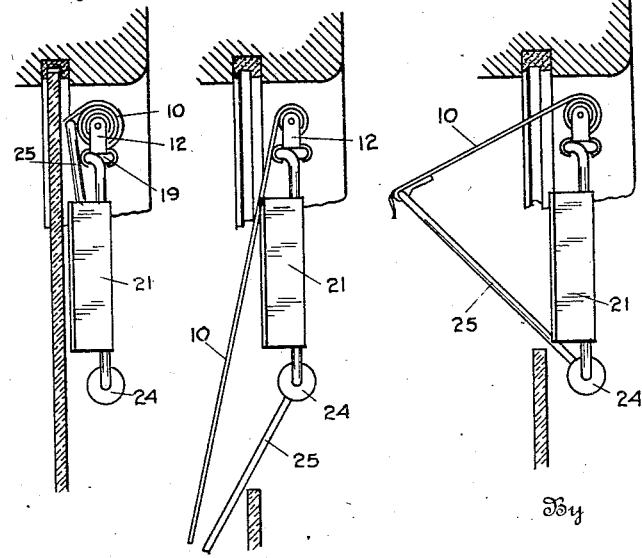
Inventor
E. E. McGrew
By Emil F. Lange
Attorney Patented Oct. 28, 1930

1,780,088

UNITED STATES PATENT OFFICE

EARL E. McGREW, OF LINCOLN, NEBRASKA, ASSIGNOR TO McGREW MACHINE COMPANY, OF LINCOLN, NEBRASKA, A CORPORATION OF NEBRASKA

AUTOMOBILE AWNING AND SHADE

Application filed August 12, 1927. Serial No. 212,472.

My invention relates to combined awnings and shades for use in automobiles and more particularly for use in automobiles of the closed type.

One of the objects of my invention is the provision of a device which may be spread into angular relation to serve as an awning or which may be extended to serve as a shade.

Another of my objects is the provision of fastening devices whereby the combined shade and awning may be quickly applied to the car without drilling or punching holes in the frame of the car and without in any way marring the finish of the car, the device being so designed that the combined shade and awning is held firmly in the window opening of the car.

One of the most important objects of my invention is the provision of adjustable means for supporting an awning whereby the frame of the awning is adjustable to fit the window openings of various widths.

Another of my objects is to provide an awning which will be entirely within the car when not in use to thus prevent theft and to avoid the action of the weather on the awning and its frame.

Still another of my objects is to provide a novel form of support for a shade roller.

Having in view these objects and others which will be pointed out in the following description, I will now refer to the drawings, in which Figure 1 is an illustration of a closed car with my combined awning and shade secured thereto.

Figure 2 is an illustration showing the combined awning and shade, a portion of the fabric being torn away to disclose certain features of the frame structure.

Figure 3 is a plan view showing the underside of the support for the shade roller.

Figure 4 is a view in section on the line 4—4 of Figure 3.

Figure 5 is a view in transverse section through a portion of the window frame showing the manner in which my device is secured to the frame of the car without the use of fastening means entering the frame of the car.

Figure 6 is a view in vertical section through the window opening of a car showing the combined awning and shade secured thereto but in its closed or folded position.

Figure 7 is a view similar to Figure 6 but showing the device opened to constitute a shade.

Figure 8 is another view similar to Figure 6 but showing the device as it appears when serving as an awning.

The awning web 10 is supported on a spring roller 11 of any preferred type. The roller 11 is journalled at its ends in ears 12 which project upwardly from the support 13. The roller 11 and the support 13 are each of fixed length and the adjustable features reside in the fastening mechanism for securing the device in the car.

The support 13 is preferably made from sheet metal and on its underside it has the appearance as shown in Figure 3. The two edges are each cut away at certain points and then rolled into the form shown in Figure 4. At the diagonally opposite ends these lateral edges are cut away at 14 and a pair of cut away portions 15 is also provided. The rolled portions 16 constitute channels in which the horizontal portions 17 of the members 18 are slidably mounted. The two horizontal portions 17 are parallel to each other and they are slidable at the opposite edges of the support 13. They are prevented from turning by means of the U-shaped bends 19 which are adapted to slide in the end portions of the support 13; these portions being merely folded into parallel relation instead of being rolled. The inner ends of the horizontal portion 17 are flattened and they are turned through an angle of about 45° to form supports for the ends of the coiled spring 20, the inclination being provided in order to keep the spring 20 out of contact with the support. It will be obvious that the horizontal portions 17 are thus slidable inwardly in the support 13 but that this slidable movement is resisted by the spring 20; the arrangement being such that neither of the horizontal portions may turn out of its plane.

The members 18 extend downwardly and they are provided with plate-like members 21 which are rolled at one of the edges to surround the member 18 and which are otherwise secured to the members 18 as by welding. These plate-like members 21 project outwardly and terminate in lips which are adapted to enter a slit in the window jambs, these slits being between the felt packing of the window groove and the frame of the window jamb. The device is secured inside the car and the lip of the plate-like member 21 must thus enter the slit on the inner side of the car. At their lower extremities the members 18 are turned toward and into alignment with each other and they are screw threaded at their extremities for the reception of wing nuts 22. They are also provided with clips 23 which support the friction members 24, the clips 23 and the friction members being preferably of integral construction.

To the lower horizontal portions of the member 18 is pivoted a bail 25, the bail being provided at its lower ends with eyes which surround the lower horizontal portions of the members 18. The arms of the bail 25 are each provided with a clip 26 having an integral friction member depending therefrom and surrounding the horizontal portion of the member 18. For convenience in manufacture and for effectiveness in use, the clips 23 and 26 with their friction members are identical. The device is assembled with a composition washer 27 between the two friction members and with a washer 28 between the wing nut 22 and the eye of the bail 25. It will thus be apparent that by tightening the wing nuts 22 any desired degree of friction may be obtained to counteract the tension of the spring roller 11 in order to hold the awning in any desired position.

The bail 25 is formed of resilient material and the tendency of its lower ends is to spread. The members 18 are spread away from each other under the action of the spring 20. At the same time there is considerable latitude of horizontal movement at both ends of the members 18 so that the device may be inserted into windows of various widths and yet be held firmly in position under the tension of the spring 20 and the action of the spring bail 25.

The awning and its frame as above described is so made that it is adjustable to automobile windows of various widths and it may be secured in the window without drilling holes in the frame of the car or without the use of special fastening means. Because of these two features it appeals strongly to dealers who are thus not required to keep on hand a supply of awnings of numerous widths and who are not required to expend considerable labor in the installation of the awning. The owner of the car may quickly and easily secure the awning in the car window and the removal is just as easy. The awning is entirely on the inside of the car and this position prevents theft of the awning as well as affords protection from rain and wind. The awning may be moved to any desired angular position to serve as an awning or it may be swung through an entire half revolution to serve as a shade, adjustable fixing means being provided to hold the awning in any of its operative positions. When not in use, the awning does not interfere with the opening and closing of the windows since the fastening means is entirely inside the car.

Having thus described my invention in such full, clear, and exact terms that its construction and operation will be readily understood by others skilled in the art to which it pertains, what I claim as new and desire to secure by Letters Patent of the United States is:

1. In an awning having an awning web and top and bottom supports therefor, an elongated member of fixed length having a spreader member secured thereto, said spreader member being adapted for compression between the window jambs of an automobile, and means for securing said elongated member to the top support of the awning web with the top support of the awning web in substantially parallel relation to said elongated member.

2. In an awning having an awning web and top and bottom supports therefor, an elongated member of fixed length having a spreader member secured thereto, said spreader member having depending arms adapted to engage the window jambs of an automobile and to be pressed thereagainst under the influence of said spreader member, and means for securing the top support of the awning web to said elongated member and in parallelism therewith.

3. In an awning having an awning web and top and bottom supports therefor, an elongated member of fixed length having a spreader member secured thereto, said spreader member being adapted for compression between the window jambs of an automobile, and ears projecting angularly from the extremities of said elongated member, said ears adapted to receive the top support of an awning web therebetween.

In testimony whereof I affix my signature.

EARL E. McGREW.